May 1, 1951     C. D. NUGENT     2,550,853
PRESSURE FILTER RECHARGE
Filed Sept. 27, 1945
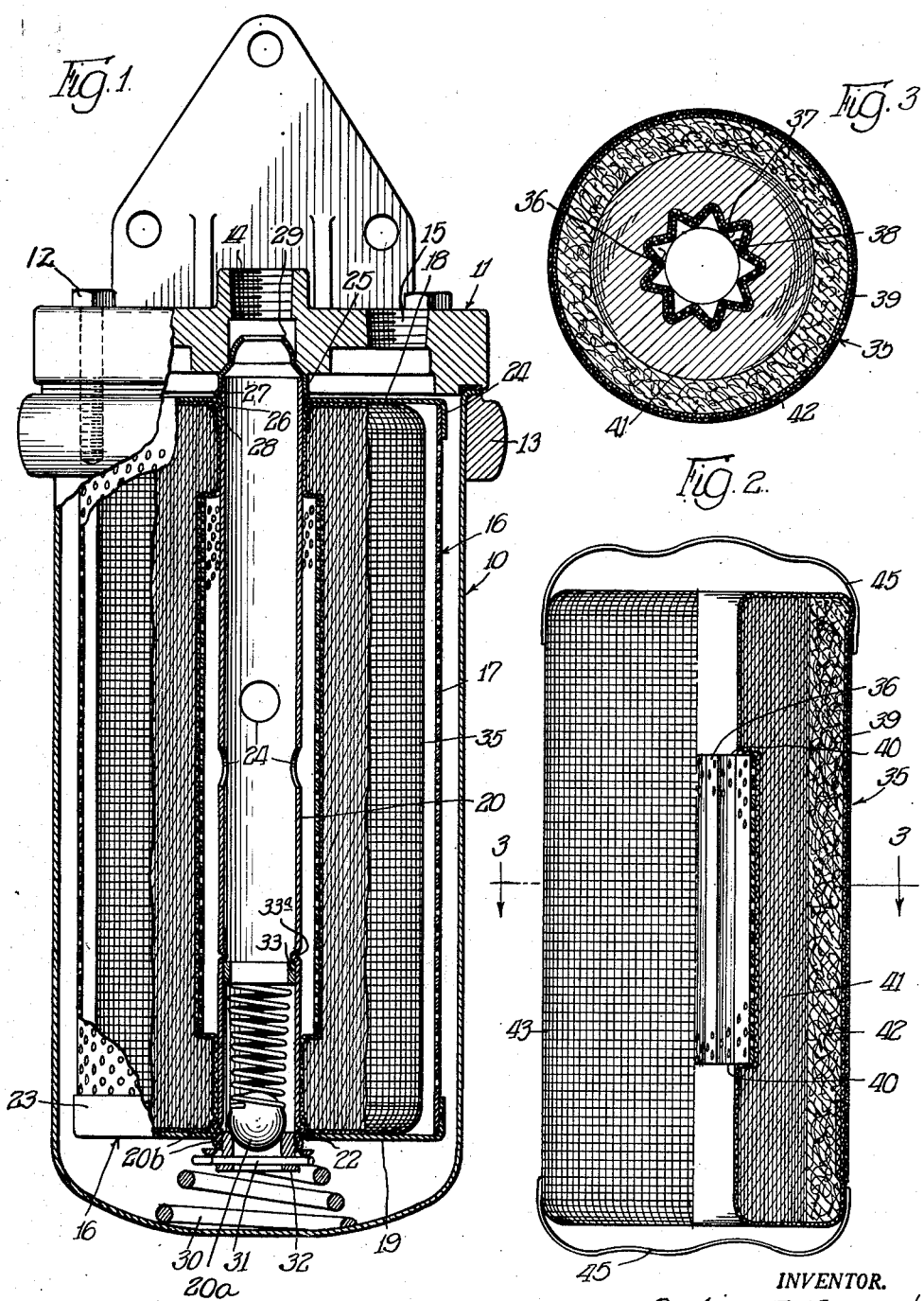
INVENTOR.
Corliss D. Nugent,
BY
Clarence F. Poole
ATTY.

Patented May 1, 1951

2,550,853

UNITED STATES PATENT OFFICE 2,550,853

PRESSURE FILTER RECHARGE

Corliss D. Nugent, Chicago, Ill.

Application September 27, 1945, Serial No. 618,898

2 Claims. (Cl. 210—183)

This invention relates to improvements in rechargeable filter elements for pressure filters of the kind having a casing and a replaceable filter element through which the oil or other liquid is forced from an inlet, thence radially through the filter element, and thence out through an outlet opening.

Filters of the kind to which the improvement herein is directed are shown in my prior Patents Nos. 2,212,647 and 2,352,732, employing a removable filter element or cartridge, consisting of a perforated metal shell packed with waste. Heretofore, these shells have usually been recharged by hand packing with waste. This method of packing is not only laborious, but often produces inefficient results, because the waste tends to pack down when in use, particularly when subjected to vibration, so as to cause short-circuiting of the oil stream, especially at the top of the shell.

In carrying out my present invention, the removable filter cartridge consists of a simple form of self-contained filtering element, filled with an especially economical and efficient filtering material, designed to withstand relatively high pressures and resist distortion, and requiring a minimum amount of metal in its construction. The filter cartridge of the present invention is particularly designed for complete fabrication at the factory, and to be thrown away after it has served its useful life.

These and other objects and advantages of the invention will appear more fully as the following specification proceeds.

In the drawings:

Figure 1 is a vertical section taken through a pressure filter, with the filter cartridge installed in operative position therein, and shown partially in section and partially in elevation.

Figure 2 is a side view, part in elevation and part in section showing the cartridge removed from the filter casing.

Figure 3 is a horizontal section taken on line 3—3 of Figure 2.

Referring now to the embodiment of the invention illustrated in the drawings, 10 indicates a filter casing and 11 indicates a cover removably secured thereto by any well-known means, such as bolts 12, 12 engaged in enlarged portions of a ring 13 surrounding the top of the casing. The casing herein consists of a drawn metal cylindrical shell. The cover 11 has a centrally disposed, threaded outlet port 14 and also a threaded inlet 15 to one side of the outlet port.

A metal container 16 is mounted in the casing, said container consisting of perforated cylindrical side walls 17, and flanged top and bottom walls 18 and 19. A tube 20 extends axially through central apertures and in the top and bottom walls respectively. In the form shown herein, the bottom end of said tube has two spaced annular shoulders 20b, 20b providing a permanent connection in the central aperture of the bottom wall 19.

The cylindrical side walls 17 of the container 16 are fitted at their bottom 23 in the flanged bottom wall 19 and are preferably secured to the latter permanently as by crimping or welding. In effect, therefore, side walls 17, bottom wall 19 and central tube 20 together form a unitary structure to which the top wall 18 is applied as a removable cover. The central tube 20 has two or more outlet ports 24, 24 therethrough, disposed about midway between the top and bottom of the container.

A hollow nipple 25 is permanently mounted in the central aperture 26 of the cover 18 by means of two spaced annular shoulders 27 and 28 formed in the walls of said hollow nipple to provide close fitting engagement with said central aperture. The said nipple is adapted for telescopic sliding engagement with the exterior of the upper end of the central tube 20 when the lid 18 is mounted upon the container 16. Said nipple also has a reduced upper end portion 29 which fits in the lower end of the outlet port 14 in cover 11 of the outer casing 10 when the parts are in assembled position as shown in Figure 1.

A coil spring 30 is mounted on the lower end of the central tube 20, as herein shown, being permanently connected to the latter by means of a cotter pin 31 passing through hollow stud 32 fixed in the lower end of said tube, and beneath the top coil of the spring 30, so that the latter spring is removable bodily with the perforated container 16 when the latter is removed from the casing 10.

In the form shown the hollow bushing 32 forms the seat for a check valve in the tube 20 consisting of a metal ball 20a pressed by a coil spring having abutment at its upper end with a ring 33. Said ring is suitably fixed within the tube 20 near its lower end as by an annular abutment 33a formed in said tube.

The tube 20 also has one or more relatively large perforations 24 intermediate its ends as shown in Figure 1.

Referring now to the filter recharge cartridge forming one of the principal features of my invention, the same is shown in detail in Figures 2 and 3 and consists of an elongated cylindrical body 35 formed upon a hollow metallic core 36 which terminates at a substantial distance from each end of the cartridge. Said metal core is generally circular in cross section, but is formed with relatively deep and sharp corrugations extending longitudinally thereof so as to form a substantially star-shaped pattern in cross section as shown in Figure 3 with the side walls 37 and 38 of each corrugation arranged at a sharp V-shaped angle to each other and to each adjacent corrugation. The walls of the corrugations are also perforated as shown in Figure 2, for passage of fluid therethrough.

The filtering body is formed around and substantially beyond the ends of the core 36 and is enclosed in a fabric cover 39, such as knitted cloth or similar material. Said covering material is preferably wrapped about the exterior of the core 36, along the hollow openings 40, 40 at opposite ends thereof, and thence outwardly along the ends and outer sides of the cartridge as shown in Figures 2 and 3 so as to fully enclose the filtering body.

The filtering body consists of an inner section 41 of laminated paper and an outer section 42 of felt. The inner section 41 is preferably formed of laminations of tissue paper, wrapped around the metal core 36, the paper sheet or sheets extending the full length of the cartridge beyond said metal core, so as to provide continuous substantially concentric layers extending to both ends of said cartridge. The outer section 42 of filtering material is preferably made of hemp felt rolled or packed around the inner section of tissue paper so as to make up approximately one-third of the thickness of filtering material within the fabric cover 39.

In the form shown, an outer cylindrical wire mesh sleeve 43 is applied to the exterior of the fabric walls, such sleeve serving to assist in maintaining the cylindrical shape of the cartridge, particularly when the latter is of relatively large dimensions. Such wire mesh sleeve, however, can be dispensed with if desired, particularly with comparatively small cartridges.

Means may also be provided for assisting in the insertion or removal of the cartridge in the perforated metal container 16, as by flexible fabric handles 45.

As will be apparent from Figure 1, when the parts of the filter are in fully closed and operative position the liquid circuit proceeds from the inlet 15 downwardly around the outer sides of the perforated casing 16 through the perforations in the latter, thence inwardly through the sides of the cartridge 35 into the hollow metal core 36, thence through the discharge ports 24, 24 in the outlet tube 20, and thence upwardly through the outlet 14 of the casing.

The arrangement of parts above described is such that the cartridge 35 may be readily inserted in the perforated container 16 when the cover 11 is removed from the casing 10 and the lid 18 of the perforated container 16 is removed from the latter. The cartridge is fitted over the central tube 20 so that the latter extends through the tubular openings 40, 40 formed at opposite ends of the core 36, and also the metal core, the latter having close-fitting engagement, as shown in Figure 3, so that the inner angular junctures between the adjacent corrugations 37 and 38 of said metal core are supported on the outer surface of said tube, to resist the fluid pressure from the exterior of the cartridge.

It will be understood that for the purpose of inserting the cartridge within the container, the flexible handles 45, 45 at opposite ends of said cartridge can be displaced laterally to permit the cartridge to pass over said tube.

The cartridge is normally made slightly longer than the metal container 16, so that when the filter cartridge is inserted therein, and in said container, the lid is placed on the latter and the several parts are finally clamped down by the lid 11 on casing 10, the portions of the filtering material beyond the ends of the core 36 in the cartridge will be compressed inwardly into close fitting engagement against the central discharge tube 20 of the container, so that no fluid can escape axially along the outlet tube 20 and through the ports 24, 24 therein without going lengthwise through a very substantial thickness of filtering material, compressed against the outlet tube 20 as just described. In the normal uncompressed state of the cartridge shown in Figure 2, the thickness of filtering material extending longitudinally at both ends beyond the core is greater than the lateral thickness of the filtering body 35.

The operation and advantages of my novel form of rechargeable filter cartridge will now be apparent to those skilled in the art. By providing a filtering body of laminated filter paper wrapped around the hollow core, and extending substantially beyond said core, the body of filtering material is arranged to resist any endwise shifting or packing down which is a common difficulty with ordinary filtering bodies employing loose waste or other materials, which tend to become displaced due to vibrations, or even under ordinary operating conditions, so as to permit bypassing of the fluid stream, particularly at the top of the filter.

Instead of packing loose waste by hand in the perforated container as is heretofore common practice with filters of this kind, my new form of self-contained filter cartridge can be readily inserted bodily in or removed from the perforated container. After removal the cartridge may be thrown away and a new one inserted with a minimum amount of labor.

The combination of inner laminations of filtering paper wrapped around the metal core, and an outer layer of felt, as described, utilizes materials which are more economical than loose waste such as heretofore employed. Moreover, the use of felt and paper in the arrangement shown provides a much more stable and satisfactory resistance media where the filter must withstand relatively high fluid pressures.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. A filter assembly for use in a pressure filter, a filter holder having perforated side walls and a fixed bottom wall, a centrally disposed apertured tube depending through and fixed to said bottom wall, a cap for the top of said holder and fitting on said tube, and a filter cartridge removably mounted in said holder comprising a cylindrical body of filtering material having an axial opening therethrough adapted for close fitting engagement on said apertured tube, the inner walls of said axial opening being formed of a rigid core with perforated walls, and having means for spacing the said core from said apertured tube, the ends of said core terminating substantially short of the ends of said filtering body, and said filtering body being substantially longer than the filter holder so that the end portions of said body beyond said core will be compressed inwardly against said apertured tube when said body is compressed endwise into said filter holder.

2. A filter cartridge for use in a pressure filter, comprising a substantially cylindrical body of filtering material having a substantially cylindrical axial opening therethrough, said body of filtering material being entirely enclosed by a continuous fabric cover, a substantially rigid core having perforated side walls inserted within the axial opening of said fabric-covered filtering body, said core being shorter than said body, with each of its ends spaced from the proximate end of said filtering body a distance substantially as great as the axial thickness of said body, and said core being formed with longitudinally extended corrugations therealong.

CORLISS D. NUGENT.

REFERENCES CITED

The following references are of record in the file of this patent:

UNITED STATES PATENTS

| Number | Name | Date |
| --- | --- | --- |
| 664,572 | McDougall | Dec. 25, 1900 |
| 1,753,809 | Short | Apr. 8, 1930 |
| 1,940,316 | McKinley | Dec. 19, 1933 |
| 2,086,739 | Reed | July 13, 1937 |
| 2,153,062 | Harlan et al. | Apr. 4, 1939 |
| 2,168,125 | Hurn | Aug. 1, 1939 |
| 2,196,821 | Arnold | Apr. 9, 1940 |
| 2,197,471 | Hooper | Apr. 16, 1940 |
| 2,209,180 | Von Pentz | July 23, 1940 |
| 2,232,423 | Alkire | Feb. 18, 1941 |
| 2,345,848 | Winslow et al. | Apr. 4, 1944 |
| 2,362,530 | Bennett | Nov. 14, 1944 |
| 2,365,766 | Levier | Dec. 26, 1944 |